Patented Oct. 22, 1946

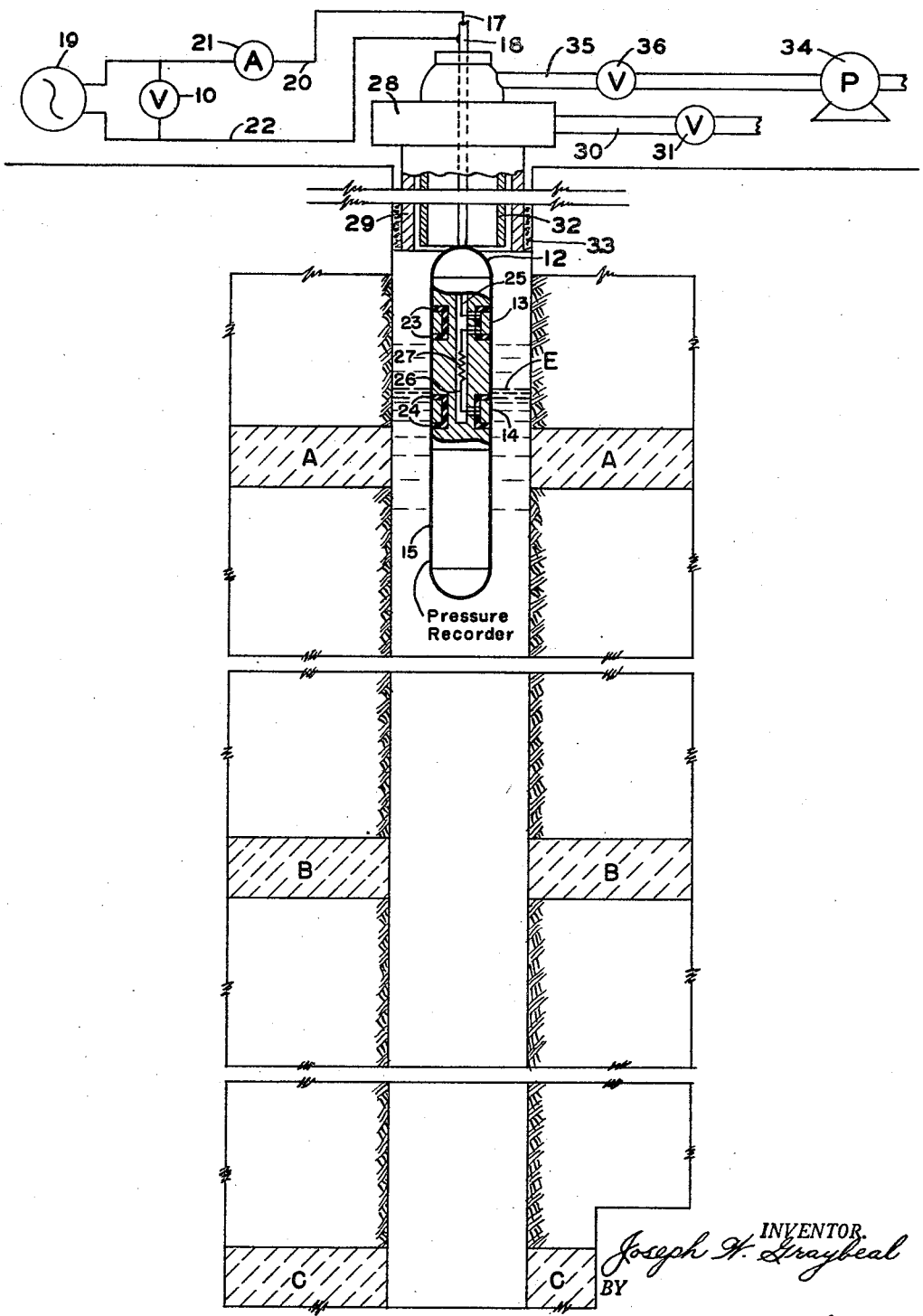

2,409,674

UNITED STATES PATENT OFFICE 2,409,674

DETERMINING PERMEABILITY OF SUBSURFACE FORMATIONS

Joseph W. Graybeal, Midland, Tex., assignor to Standard Oil Development Company, a corporation of Delaware Application March 22, 1945, Serial No. 584,183

3 Claims. (Cl. 73—152)

The present invention is directed to a method for logging a borehole to determine the permeability of formations through which the hole extends.

In its more specific aspects, the present invention is directed to a method for determining the permeability of a plurality of formations penetrated by a borehole wherein liquid including a body of a conducting liquid adjacent a body of non-conducting liquid to form an interface between the two bodies is pumped down the bore of a well and some of the liquid forced into formations through which the hole extends, the rate at which liquid is forced from the borehole into formations determined and the differential pressure at the face of a formation required to force the liquid into the formation is measured.

Other objects and advantages of the present invention will be seen from a reading of the following description taken in conjunction with the drawing in which the sole figure schematically illustrates apparatus which may be employed in the practice of the present invention and shows the apparatus being used in the determination of the permeability of strata penetrated by a borehole.

The present invention is particularly advantageous for determining the permeability of formations penetrated by the borehole wherein the normal liquid level of the borehole is a substantial distance below the surface of the earth. It is well known to the art that in some wells the normal liquid level may be hundreds of feet below the surface of the earth and when pumping fluid into such wells it is extremely difficult, if not impossible, to maintain the input pressure at a constant value. In other words, it is difficult, if not impossible, to force fluid into the borehole at a sufficiently great rate to maintain the borehole full of liquid and the fluctuations in the liquid level as fluid is pumped into the borehole produces corresponding fluctuations in the pressure in the borehole adjacent the formations into which fluid is flowing. If the normal liquid level of the well is of the order of 600 feet below the surface of the earth the outlet pressure of the pump used to force the liquid into the borehole will be seen to be of no value in determining the pressures within the borehole itself and similarly the fluctuation in the liquid level within the borehole may be of such an order as to introduce substantial errors into any calculations requiring the use of a value of pressure.

In the method of the present invention the borehole of which a permeability log is to be obtained is shut in until the pressures therein reach a constant value and these constant values of pressure are determined along the bore of the well. In determining the shut-in pressures of the well adjacent the faces of the formations penetrated by the borehole, any conventional device for determining borehole pressures may be employed. A pressure gauge suitable for obtaining borehole pressures is disclosed by Wilde, U. S. Patent 2,078,623, April 27, 1937, but it will be understood that other conventional borehole pressure indicating devices may be used for this purpose. If desired, the borehole pressures along the entire bore of the well may be obtained or, in alternative, formations may be preselected and the shut-in pressures adjacent the face of each of these selected formations may be determined.

After the shut-in pressures of the well have been determined, liquid may be pumped into the well and forced down the bore of the well with portions of the liquid passing outwardly from the bore of the well into porous formations penetrated by the well. As the body of the liquid is forced downwardly into the well, the rates at which portions of the liquid pass into the permeable formations are determined and simultaneously with this determination the pressures at the faces of the porous formations into which the liquid is being forced are determined. When the shut-in pressure of a formation is subtracted from the pressure at the face of the formation when the liquid is being forced into it, the remainder is the pressure differential required to force liquid into the formation at that rate of flow. When this information has been obtained the values may be used in D'Arcy's equation to obtain the relative permeabilities of the formations penetrated by the bore of the well. The values of the relative permeabilities of these formations may be plotted on a sheet of paper at points corresponding to the depth of the formations to produce a log of the well.

In the interpretation of D'Arcy's law the following equation may be employed:

$$K = \frac{CquL}{A\Delta P}$$

Where K equals the relative permeability, $q$ equals cc. of fluid per second taken per foot of formation, $u$ equals fluid viscosity, which may be assumed to be one, L equals length centimeters, which may be assumed to be one, A equals area of hole in square centimeters per lineal foot, $\Delta P$ equals differential pressure and C equals a constant.

In applying this formula to a borehole, $u$ may be assumed as unity, L as unity and A as a constant. Accordingly, the equation may be simplified as follows:

$$K = \frac{Q}{\Delta P}$$

Where Q is any convenient volume of fluid per unit time per lineal unit of the hole and $\Delta P$ is the pressure differential in any convenient unit.

It will be understood that neither the first nor the second formula gives the permeability of a formation in actual D'Arcy units, but only the relative permeability of formations is obtained by the application of this formula.

Turning now specifically to the drawing, 11 designates the bore of a well which may penetrate a large number of formations. In the drawing a section of the well is indicated and in this section only three formations, A, B, and C are specifically designated. It will be understood that a large number of other formations may separate formation A from formation B and similarly a large number of formations may separate formation B from formation C, but in order to simplify the drawing, such formations have not been specifically shown nor designated. Formations A, B, and C represent the formations having substantial permeability in the section of the borehole shown in the drawing.

An instrument which may be employed in the practice of the invention is shown schematically in the drawing. This instrument includes a portion adapted to be moved along the bore of the well and equipment adapted to be placed at the surface of the earth. That portion of the equipment adapted to be moved along the borehole includes an elongated body 12 which is provided with electrodes or exposed contacts 13 and 14 and has attached thereto a suitable pressure indicating device 15. In order to simplify the description of the present invention, the pressure indicating or recording device 15 is not shown in detail since such devices are well known, for example, it may be a device constructed in accordance with the disclosure of Patent 2,078,623.

Elongated body 12 is arranged to be suspended from cable 16, which serves as a means for moving body 12 longitudinally along the bore of the well. Cable 16 includes a single insulated conductor 17 and a metallic cable sheath 18.

Adopted to be arranged at the surface of the earth, is a source of electrical power 19. This source of power may conveniently produce alternating current and be connected to insulated conductor 17 by means of electrical connection 20 having arranged therein ammeter 21 and to the metallic sheath 18 of the cable through conductor 22. A voltmeter 10 may be connected across conductors 20 and 22.

Mounted on elongated body 12 are electrodes 13 and 14. Electrodes 13 and 14 are insulated from body 12 by suitable insulating means, such as insulating sections 23 and 24. Electrode 13 is electrically connected to the insulated conductor 17 of the cable by insulated conductor 25, and electrode 14 is electrically connected to electrode 13 by insulated conductor 26 containing a relatively high resistance 27.

The upper end of the well may be provided with a conventional wellhead. In the drawing, such equipment is shown diagrammatically and on a smaller scale than the remainder of the drawing as a wellhead 28 mounted on casing 29 and provided with a side outlet 30 controlled by valve 31. The well is provided with a string of tubing 32 with its upper end extending through head 28. The lower end of the tubing is adjacent the lower end of the casing cemented in position with cement seal 33. A means for forcing liquid into the well is indicated as pump 34 having its outlet connected to tubing 32 by means of conduit 35 controlled by valve 36; it will be understood that the inlet 37 of the pump may be connected with any suitable source of supply of liquid, not shown. It may be mentioned that often only the permeability of a well below the end of the tubing is to be obtained and the tubing left in the well and the elongated body 12 run through the tubing; however, if the permeability of the formations above this point are to be determined, the tubing may be raised, or entirely removed from the well before running body 12 along the bore of the well.

By closing valves 31 and 36 the well may be shut in, and the shut-in pressure in the well adjacent strata A, B and C may be determined by a conventional means; in the apparatus of the drawing elongated body 12 with pressure recorder 15 attached thereto may be passed along the bore of the well and the shut-in pressures at these points measured by pressure recorder 15.

The rate at which fluid is forced into the formation may be determined by placing a body of a conducting liquid, such as salt water or acid, in the well and following it by a body of a nonconductor, such as oil, to produce an interface between the conducting liquid body and the non-conducting liquid body. The elongated body 12 of the instrument may then be placed at the interface and the interface forced down into the borehole by following the body of non-conducting liquid with additional liquid. In the drawing, the interface in the borehole is indicated by letter E. In order to complete the electric circuit to draw power from unit 19, it is necessary for one of contacts 13, 14 to be immersed in electrolyte. If both contacts are submerged in electrolyte the resistance 27 is by-passed by the current and a large reading is indicated by ammeter 21 at the surface of the earth. If both contacts 13 and 14 are immersed in a non-conductor, the reading of the ammeter 21 is zero. When the lower contact 14 is immersed in an electrolyte and the upper contact 13 is immersed in a non-conducting liquid, as shown in the drawing, an electrical circuit is completed down the cable, through resistance 27 to electrode 14, through electrolyte to the body 12 of the pilot, and upwardly through metallic cable sheath 18 to give a reading on ammeter 21. The value indicated by ammeter 21 when only electrode 14 is immersed in electrolyte is substantially less than the value indicated when both electrodes are immersed in an electrolyte.

It will be seen that when liquid is forced from the well into permeable formations penetrated by the well, the interface moves downwardly and the rate at which it moves may be exactly determined by lowering body 12 to maintain electrode 14 within the electrolyte and electrode 13 within the non-conducting liquid. Accordingly, the rate at which liquid is taken by the several permeable formations A, B, and C may readily be determined. In other words, the total volume absorbed by all of the permeable formations in the well is determined and as the interface E successively passes below each of the permeable formations, the rate at which it moves downwardly is diminished by the amount of liquid flowing into these permeable formations.

In accordance with the present invention, the pressure adjacent the face of the formation is determined simultaneously with the determination of the rate at which liquid is absorbed thereby. In other words, as body 12 is moved downwardly past formation A, the pressure adjacent the face of the formation is indicated by pressure recording device 15 and, at the same time, the rate at which the interface E is moving downwardly at this point allows the rate at which fluid flows into the formation A to be determined. Similarly, as body 12 is moved adjacent formation B, the pressure adjacent the face of this formation is determined simultaneously with the rate at which fluid flows into this formation and, in like manner, when body 13 is moved adjacent formation C, the pressure adjacent the face of formation C is determined simultaneously with the determination of the rate at which fluid enters this formation. Since the shut-in pressure in the well adjacent formations A, B and C has been previously determined, the pressure differential required to force the fluid into the respective formations A, B and C may be obtained by subtracting from the pressure required to force liquid into the formations A, B and C the shut-in pressure of the well at these points and this pressure differential and the rate at which fluid passes into the respective formations may be substituted into the D'Arcy formula to give values indicating the relative permeability of the formations A, B and C.

Having fully described and illustrated the practice of the present invention, what I desire to claim is:

1. In the logging of a borehole penetrating formations having sufficient permeability to allow appreciable amounts of liquid to be forced therein, the steps of determining adjacent the face of a formation the shut-in pressure of the borehole, introducing a body of liquid into the bore of the well, forcing portions of said body of liquid into a plurality of formations and the remainder of the body of liquid downwardly through the bore of the well, determining the rate at which a portion of the body of liquid is forced into the selected formation and simultaneously with the forcing of liquid therein determining the pressure in the borehole adjacent the face of said formation.

2. In the logging of a borehole penetrating formations having sufficient permeability to allow appreciable amounts of liquid to be forced therein, the steps of determining the shut-in well pressure at points vertically spaced in the borehole with each point adjacent the face of a different formation, subsequently introducing a body of liquid into the bore of the hole, forcing portions of the liquid into the permeable formations penetrated by the borehole and the remainder of the body of liquid downwardly through the bore of the hole, determining the rate at which portions of the body of liquid are forced outwardly into the formations adjacent which the shut-in pressures were determined and determining the pressures in the borehole adjacent the faces of said formations simultaneously with determining the rate at which liquid is forced into said formations.

3. In the logging of a borehole penetrating formations having sufficient permeability to allow appreciable amounts of liquid to be forced therein, the steps of shutting in the well, determining the pressures adjacent the faces of a plurality of vertically spaced formations penetrated by the borehole while the well is shut in, subsequently forcing liquid to flow from the bore of the well into each of said plurality of formations, determining in sequence from the uppermost to the lowermost of each of said plurality of formations the rate at which liquid is forced therein and measuring the pressure in the bore of the well adjacent the face of each formation while determining the rate at which it is forced therein.

JOSEPH W. GRAYBEAL.